US012376193B2

(12) United States Patent
Reta et al.

(10) Patent No.: US 12,376,193 B2
(45) Date of Patent: Jul. 29, 2025

(54) APPARATUS, SYSTEM AND METHOD OF PROVIDING A CONFORMABLE HEATER IN WEARABLES

(71) Applicant: JABIL INC., St. Petersburg, FL (US)

(72) Inventors: Arnoldo Reta, St. Petersburg, FL (US); Sai Guruva Avuthu, St. Petersburg, FL (US); Mary Alice Gill, St. Petersburg, FL (US); Nabel M. Ghalib, St. Petersburg, FL (US); Mark Edward Sussman, St. Petersburg, FL (US)

(73) Assignee: JABIL INC.

( * ) Notice: Subject to any disclaimer, the term of this patent is extended or adjusted under 35 U.S.C. 154(b) by 0 days.

(21) Appl. No.: 18/657,201

(22) Filed: May 7, 2024

(65) Prior Publication Data

US 2024/0407055 A1 Dec. 5, 2024

Related U.S. Application Data

(63) Continuation of application No. 17/718,024, filed on Apr. 11, 2022, now Pat. No. 12,010,765, which is a (Continued)

(51) Int. Cl.
*H05B 1/02* (2006.01)
*A41D 13/005* (2006.01)
(Continued)

(52) U.S. Cl.
CPC ........... *H05B 1/0272* (2013.01); *H05B 3/145* (2013.01); *H05B 3/34* (2013.01); *A41D 13/0051* (2013.01);
(Continued)

(58) Field of Classification Search
CPC ........ H05B 1/0272; H05B 3/34; H05B 3/342; H05B 3/345; H05B 3/347; H05B 2203/01;
(Continued)

(56) References Cited

U.S. PATENT DOCUMENTS

| | | | |
|---|---|---|---|
| 4,665,304 | A | 5/1987 | Spencer |
| 5,925,275 | A | 7/1999 | Lawson |

(Continued)

FOREIGN PATENT DOCUMENTS

| | | |
|---|---|---|
| CN | 1104014 | 6/1995 |
| CN | 101253820 | 8/2008 |

(Continued)

OTHER PUBLICATIONS

Office Action (Non-Final Rejection) dated Nov. 21, 2023 for U.S. Appl. No. 18/104,621 (pp. 1-11).

(Continued)

*Primary Examiner* — Brian W Jennison
(74) *Attorney, Agent, or Firm* — Riverside Law LLP

(57) ABSTRACT

The disclosure provides an apparatus, system and method for a flexible heater suitable for embedding in a wearable. The flexible heater comprises a conformable substrate; a matched function ink set, printed onto at least one substantially planar face of the substrate to form at least a conductive layer capable of receiving current flow from at least one power source; a resistive layer electrically associated with the at least one conductive layer and comprising a plurality of heating elements capable of generating heat upon receipt of the current flow; and a dielectric layer capable of at least partially insulating the at least one resistive layer, wherein the matched ink set is matched to preclude detrimental interactions between the printed inks of each of the at least one conductive, resistive and dielectric layers, and to preclude detrimental interactions with the conformable substrate.

18 Claims, 6 Drawing Sheets

Related U.S. Application Data continuation of application No. 15/689,611, filed on Aug. 29, 2017, now Pat. No. 11,304,263.

(51) Int. Cl.
*H05B 3/14* (2006.01)
*H05B 3/34* (2006.01)

(52) U.S. Cl.
CPC .. *H05B 2203/013* (2013.01); *H05B 2203/036* (2013.01)

(58) Field of Classification Search
CPC ............. H05B 2203/03; A41D 13/005; A41D 13/0051
See application file for complete search history.

(56) References Cited

U.S. PATENT DOCUMENTS

| | | | |
|---|---|---|---|
| 6,055,722 | A | 5/2000 | Tighe |
| 6,142,974 | A | 11/2000 | Kistner |
| 6,235,047 | B1 | 5/2001 | Augustine |
| 6,884,965 | B2 | 4/2005 | Nelson |
| 8,084,722 | B2 | 12/2011 | Haas |
| 9,657,963 | B2 | 5/2017 | Lazanja |
| 9,877,526 | B2 | 1/2018 | Haas |
| 10,201,935 | B2 | 2/2019 | Augustine |
| 2002/0153367 | A1 | 10/2002 | Haas |
| 2005/0007406 | A1 | 1/2005 | Haas |
| 2005/0115956 | A1 | 6/2005 | Wong |
| 2005/0244587 | A1 | 11/2005 | Shirlin |
| 2006/0060576 | A1 | 3/2006 | Haas |
| 2006/0119874 | A1 | 6/2006 | Kurihara |
| 2006/0159899 | A1 | 7/2006 | Edwards |
| 2008/0083721 | A1 | 4/2008 | Kaiserman |
| 2008/0135408 | A1 | 6/2008 | Sjolander |
| 2009/0047008 | A1 | 2/2009 | Straley |
| 2009/0291604 | A1 | 11/2009 | Park |
| 2010/0140673 | A1 | 6/2010 | Daniel |
| 2011/0117705 | A1 | 5/2011 | Samples |
| 2011/0194846 | A1 | 8/2011 | Wang |
| 2013/0228562 | A1 | 9/2013 | Chen |
| 2013/0248226 | A1 | 9/2013 | Sime |
| 2014/0109667 | A1 | 4/2014 | White |
| 2014/0222121 | A1 | 8/2014 | Spence |
| 2014/0263265 | A1 | 9/2014 | Augustine |
| 2015/0250420 | A1 | 9/2015 | Longinotti-Buitoni |
| 2015/0366367 | A1 | 12/2015 | Augustine |
| 2017/0239404 | A1 | 8/2017 | Shavit |

FOREIGN PATENT DOCUMENTS

| | | |
|---|---|---|
| CN | 102123561 | 7/2011 |
| CN | 103763956 | 4/2014 |
| CN | 105188164 | 12/2015 |
| CN | 105979616 | 9/2016 |
| CN | 206333390 | 7/2017 |
| CN | 107006074 | 8/2017 |
| EP | 3068189 | 9/2016 |
| KR | 20070000597 | 5/2007 |
| KR | 20120110932 | 10/2012 |
| KR | 101376107 | 3/2014 |
| WO | 2016060838 | 4/2016 |

OTHER PUBLICATIONS

Office Action (Notice of Allowance and Fees Due (PTOL-85)) dated Feb. 8, 2024 for U.S. Appl. No. 17/718,024 (pp. 1-7).
Office Action (Notice of Allowance and Fees Due (PTOL-85)) dated May 3, 2024 for U.S. Appl. No. 18/104,621 (pp. 1-7).

APPARATUS, SYSTEM AND METHOD OF PROVIDING A CONFORMABLE HEATER IN WEARABLES

CROSS-REFERENCE TO RELATED APPLICATIONS

This application is a continuation of U.S. application Ser. No. 17/718,024, filed Apr. 11, 2022, which is a continuation of U.S. application Ser. No. 15/689,611, filed Aug. 29, 2017, each of which is hereby incorporated by reference in its entirety.

BACKGROUND

Field of the Disclosure

The disclosure relates generally to printed electronics and, more particularly, to a conformable heater, such as for use in wearables.

Description of the Background

Printed electronics uses printing, or "additive," methods to create electrical (and other) devices on various substrates. Printing typically defines patterns on various substrate materials, such as using screen printing, flexography, gravure, offset lithography, and inkjet. Electrically functional electronic or optical inks are deposited on the substrate using one or more of these printing techniques, thus creating active or passive devices, such as transistors, capacitors, resistors and inductive coils.

Printed electronics may use inorganic or organic inks. These ink materials may be deposited by solution-based, vacuum-based, or other processes. Ink layers may be applied one atop another. Printed electronic features may include be or include semiconductors, metallic conductors, nanoparticles, nanotubes, etc.

Rigid substrates, such as glass and silicon, may be used to print electronics. Poly(ethylene terephthalate)-foil (PET) is a common substrate, in part due to its low cost and moderately high temperature stability. Poly(ethylene naphthalate)-(PEN) and poly(imide)-foil (PI) are alternative substrates. Alternative substrates include paper and textiles, although high surface roughness and high absorbency in such substrates may present issues in printing electronics thereon. In short, it is typical that a suitable printed electronics substrate preferably has minimal roughness, suitable wettability, and low absorbency.

Printed electronics provide a low-cost, high-volume volume fabrication. The lower cost enables use in many applications but generally with decreased performance over "conventional electronics." Further, the fabrication methodologies onto various substrates allow for use of electronics in heretofore unknown ways, at least without substantial increased costs. For example, printing on flexible substrates allows electronics to be placed on curved surfaces, without the extraordinary expense that the use of conventional electronics in such a scenario would require.

Moreover, conventional electronics typically have lower limits on feature size. In contrast, higher resolution and smaller structures may be provided using printed electronics, thus providing variability in circuit density, precision layering, and functionality not available using conventional electronics.

Control of thickness, holes, and material compatibility are essential in printing electronics. In fact, the selection of the printing method(s) used may be determined by requirements related to the printed layers, layer characteristics, and the properties of the printed materials, such as the aforementioned thicknesses, holes, and material types, as well as by the economic and technical considerations of a final, printed product.

Typically, sheet-based inkjet and screen printing are best for low-volume, high-precision printed electronics. Gravure, offset and flexographic printing are more common for high-volume production. Offset and flexographic printing are often used for both inorganic and organic conductors and dielectrics, while gravure printing is highly suitable for quality-sensitive layers, such as within transistors, due to the high layer quality provided thereby.

Inkjets are very versatile, but generally offer a lower throughput and are better suited for low-viscosity, soluble materials due to possible nozzle clogging. Screen printing is often used to produce patterned, thick layers from paste-like materials. Aerosol jet printing atomizes the ink, and uses a gas flow to focus printed droplets into a tightly collimated beam.

Evaporation printing combines high precision screen printing with material vaporization. Materials are deposited through a high precision stencil that is "registered" to the substrate. Other methods of printing may be used, such as microcontact printing and lithography, such as nano-imprint lithography.

Electronic functionality and printability may counterbalance one other, mandating optimization to allow for best results. By way of example, a higher molecular weight in polymers enhances conductivity, but diminishes solubility. Further, viscosity, surface tension and solids content must be tightly selected and controlled in printing. Cross-layer interactions, as well as post-deposition procedures and layers, also affect the characteristics of the final product.

Printed electronics may provide patterns having features ranging from 3-10 μm or less in width, and layer thicknesses from tens of nanometers to more than 10 μm or more. Once printing and patterning is complete, post treatment of the substrate may be needed to attain final electrical and mechanical properties. Post-treatment may be driven more by the specific ink and substrate combination.

Typical heaters for use in wearables, such as in garments or accessories, are manufactured using conventional electronics techniques and manual labor. For example, rigid, thick, and bulky heaters are typically provided, such as in association with printed circuit boards and the like. The wiring that allows for operation of these thick, bulky heaters is typically sewn into the wearables, such as between fabric layers, to enclose the heating elements into the fabrics.

Moreover, less bulky heaters that are fabricated using atypical types of processing are typically expensive, in part because of the complex fabrication steps needed to create such heaters. Hence, these heaters are not applicable for wearable applications. Further, either of the foregoing atypical or conventional types of heaters necessitates an extraordinary level of encapsulation if the wearable associated with the heater is, for example, to be laundered. This is particularly the case if the wearable is to be laundered many times over its life cycle. That is, the limiting factor in the life cycle of the wearable should not be the heater provided in association with the wearable.

Therefore, a heater for use in wearables that may be assembled using in-line and/or high throughput processes, such as additive printing processes, and which is thus less complex in its fabrication resulting in more cost-efficient manufacturing, longer use life of the heater and the wearable, and other distinct advantages, is needed. Such a heater should be formed in a thin, less bulky, more conformable and flexible format, and on a wearable-moldable substrate, to not only address the foregoing concerns, but also to allow for integration into more diverse types of wearables.

SUMMARY

Thus, the disclosure provides at least an apparatus, system and method for a flexible heater suitable for embedding in a wearable. The flexible heater comprises a conformable substrate; a matched function ink set, printed onto at least one substantially planar face of the substrate to form at least a conductive layer capable of receiving current flow from at least one power source; a resistive layer electrically associated with the at least one conductive layer and comprising a plurality of heating elements capable of generating heat upon receipt of the current flow; and a dielectric layer capable of at least partially insulating the at least one resistive layer, wherein the matched ink set is matched to preclude detrimental interactions between the printed inks of each of the at least one conductive, resistive and dielectric layers, and to preclude detrimental interactions with the conformable substrate.

The flexible heater may additionally include an encapsulation that at least partially seals at least the conformable substrate having the matched function ink set thereon from environmental factors. The flexible heater may additionally be integrated into the wearable of the conformable substrate having the matched ink set thereon.

The flexible heater may further comprise a driver circuit connectively associated with the at least one conductive layer. The driver circuit may comprise a control system, and wherein an amount of heat delivered by the heating elements is controlled by the control system.

Thus, the disclosure provides a heater for use in wearables that may be assembled using in-line and/or high throughput processes, such as additive printing processes, and which is thus less complex in its fabrication resulting in more cost-efficient manufacturing, longer use life of the heater and the wearable, and other distinct advantages.

BRIEF DESCRIPTION OF THE DRAWINGS

The exemplary compositions, systems, and methods shall be described hereinafter with reference to the attached drawings, which are given as non-limiting examples only, in which.

DETAILED DESCRIPTION

Figure 1:
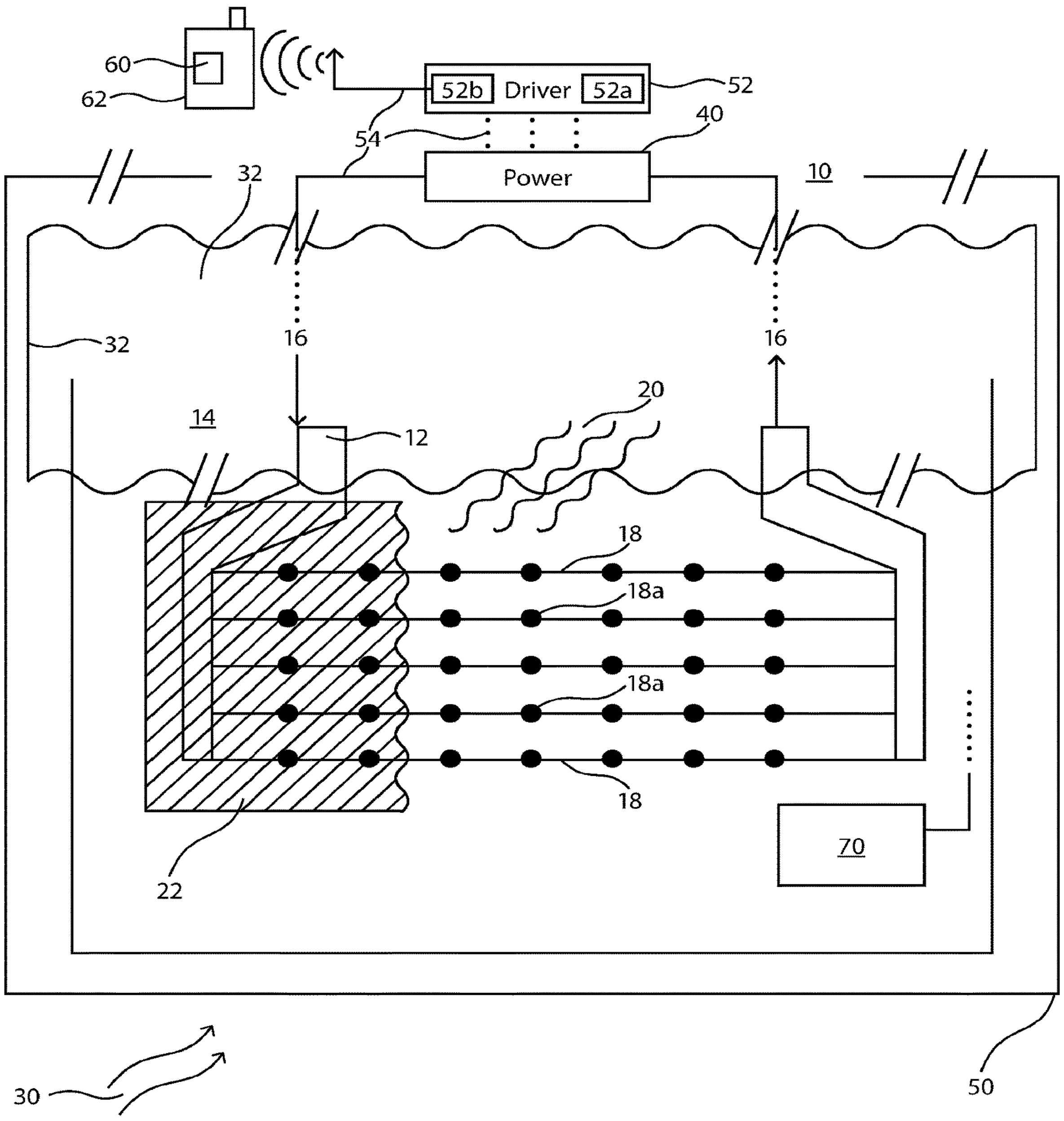
FIG. 1 is a schematic and block diagram illustrating a heater according to the embodiments.

The figures and descriptions provided herein may have been simplified to illustrate aspects that are relevant for a clear understanding of the herein described apparatuses, systems, and methods, while eliminating, for the purpose of clarity, other aspects that may be found in typical similar devices, systems, and methods. Those of ordinary skill may thus recognize that other elements and/or operations may be desirable and/or necessary to implement the devices, systems, and methods described herein. But because such elements and operations are known in the art, and because they do not facilitate a better understanding of the present disclosure, for the sake of brevity a discussion of such elements and operations may not be provided herein. However, the present disclosure is deemed to nevertheless include all such elements, variations, and modifications to the described aspects that would be known to those of ordinary skill in the art.

Embodiments are provided throughout so that this disclosure is sufficiently thorough and fully conveys the scope of the disclosed embodiments to those who are skilled in the art. Numerous specific details are set forth, such as examples of specific components, devices, and methods, to provide a thorough understanding of embodiments of the present disclosure. Nevertheless, it will be apparent to those skilled in the art that certain specific disclosed details need not be employed, and that embodiments may be embodied in different forms. As such, the embodiments should not be construed to limit the scope of the disclosure. As referenced above, in some embodiments, well-known processes, well-known device structures, and well-known technologies may not be described in detail.

The terminology used herein is for the purpose of describing particular embodiments only and is not intended to be limiting. For example, as used herein, the singular forms "a", "an" and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The steps, processes, and operations described herein are not to be construed as necessarily requiring their respective performance in the particular order discussed or illustrated, unless specifically identified as a preferred or required order of performance. It is also to be understood that additional or alternative steps may be employed, in place of or in conjunction with the disclosed aspects.

When an element or layer is referred to as being "on", "upon", "connected to" or "coupled to" another element or layer, it may be directly on, upon, connected or coupled to the other element or layer, or intervening elements or layers may be present, unless clearly indicated otherwise. In contrast, when an element or layer is referred to as being "directly on," "directly upon", "directly connected to" or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). Further, as used herein the term "and/or" includes any and all combinations of one or more of the associated listed items.

Yet further, although the terms first, second, third, etc. may be used herein to describe various elements, components, regions, layers and/or sections, these elements, components, regions, layers and/or sections should not be limited by these terms. These terms may be only used to distinguish one element, component, region, layer or section from another element, component, region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the embodiments.

Historically and as discussed throughout, the formation of many small aspects of devices or small devices has generally integrated the processes of deposition and etching. That is, traces, such as conductive traces, dielectric traces, insulating traces, and the like, which include formation of device features such as wave guides, vias, connectors, and the like, have generally been formed by subtractive processes, i.e., by creating layers which were later etched to remove portions of those layers to form the desired topologies and features of a device.

Additive printing processes have been developed whereby device features and aspects are additively formed, i.e., are formed by "printing" the desired feature at the desired location and in the desired shape. This has allowed for many devices and elements of devices that were previously formed using subtractive processes to be formed via additive processes, including, but not limited to, printed transistors, carbon-resistive heating elements, piezo-elements and audio elements, photodetectors and emitters, and devices for medical use, such as glucose strips and ECG straps.

In short, the printing of such devices is dependent on a number of factors, including matching deposited materials, such as inks, to substrates for particular applications. This ability to use a variety of substrates may afford unique properties to printed devices that was previously unknown in etched devices, such as the ability for devices to stretch and bend, and to be used in previously unknown or inhospitable environments, such as use as conformable heaters in wearables that are to be laundered. By way of non-limiting example, the ability to print electronic traces on plasticized substrates allows for those substrates to be conformed after printing has occurred.

However, known additive properties do present limitations over the properties previously available using subtractive processing. For example, it is typical that conductive traces formed using additive processes have more limited conductivity than the conductive traces previously formed using subtractive processes. This is, in part, because pure copper traces provided using subtractive processes are presently unavailable to be printed using modern additive processing. Accordingly, some devices and elements thereof, such as heaters, may be subjected to substantial modification in order to accommodate the modified properties available using printed traces in additive processes, as compared to the use of conventional electronics-formation techniques.

In the embodiments, a large number of factors must be balanced in each unique application in order to best arrive at properties that most closely approximate those properties previously available only in subtractive processes. For example, in the disclosed devices and processes for creating those devices, compatibility must be assessed as between a substrate for printing and the receptivity of such substrate, the inks employed and the conductivity thereof, the fineness of the printed traces used, the pitch, density and consistency of the printed inks, the type of printing performed, i.e., screen printing versus other types of printing, the thickness of the printed layers, and the like. Moreover, because multiple inks may be employed in order to create the disclosed heating elements, the compatibility of the inks used with one another is also an aspect of the embodiments. For example, chemical reactions between inks, different curing methodologies between inks, and the manner of deposition as between inks must all be assessed for all inks within a given ink set. Also of note, the skilled artisan will appreciate, in light of the discussion herein, that different inks within an ink set may have variable characteristics even after deposition. For example, certain inks may suffer from a valley effect in the center of a deposited trace of that ink, while peaks are created at the outer part of traces using that ink. Accordingly, because the thickness of a trace deposited using such an ink may allow for alleviation or heightening of the foregoing effect, the manner and consistency of application of each ink within an ink set is noteworthy in the embodiments.

In the known art of incorporated heaters, printed circuit boards needed to be mechanically integrated, and hence accounted for, within each product. However, the ability to use printed electronics with flexible substrates and substrates having uneven topologies may allow for printed electronics to be integrated as part of a product, instead of necessitating a mechanical integration of the electronics into the finished product. Needless to say, this may include the use of printed electronics onto substrates unsuitable for accepting electronics created using subtractive processes, such as fabrics, plastics that do not provide "sticky" surfaces, organic substrates, and the like. This may occur, for example, because additive processes allow for different printing types within each subsequently printed layer of the printed device, and thereby the functionality provided by each layer, such as mechanical, electrical, structural, or other functionality, may be varied as between printed layers throughout a deposition process.

Various solutions to balance the foregoing factors may be provided using additive processing. For example, a flexible substrate may be provided, wherein printing occurs on one or both sides of the substrate. Thereby, traces may be produced on one or both sides of the substrate to form one heater, or series or parallel heaters. In such instances, one or more vias may be created between the sides of the substrate, thus producing one heating system, or multiple heat systems on opposing sides of the substrate which are connectible through the substrate.

More particularly, in the embodiments, a flexible heater for use in a wearable may be printed onto a flexible and conformable organic or inorganic substrate, such as using a "matched function" ink set. The flexible heater may be comprised of multiple layers of inks or substances forming the matched function set. For example, and as illustrated with respect to the heater 10 of FIG. 1, a conductive layer 12 may be printed onto substrate 14 to allow for current flow 16 to the heater. A resistive layer 18 may also or subsequently be printed to allow for the heating effect 20 to occur upon heating of the resistors due to the current flow 16 therethrough. Further, a dielectric layer 22 may be printed to insulate the resistive elements 18*a*, both from shorting onto one another because of the conformable, flexible nature of the substrate 14, and to insulate the heat produced by the heating elements 18*a* to avoid localized overheating.

The substrate 14 onto which the layers 12, 18, 22 are printed may include both organic and inorganic substrates, subject to the limitation that substrates may be flexible and/or conformable to the wearable into or onto which the heater 10 is placed. Suitable substrates may include, but are not limited to PET, PC, TPU, nylon, glass, fabric, PEN, and ceramics.

As referenced above, various inks and ink sets may be used to form the layers 12, 18, 22, or aspects thereof, in heater 10, and inks within the set may be matched to one another so as to avoid undesired chemical interactions during deposition, curing, etc., and/or may be matched to the substrate onto which the inks are to be printed. By way of non-limiting example, conductive and resistive inks used may include silver, carbon, PEDOT:PSS, CNT, or a variety of other printable, conductive, dielectric and/or resistive materials that will be apparent to the skilled artisan in light of the discussion herein.

In certain wearables, particularly those exposed to the elements and/or intended for laundering, the heating system 10 may preferably be encapsulated in order to increase durability. In such cases, isolation from environmental conditions 30, such as wet conditions, including rain, snow, or humidity, and/or insulation from wash and dry cycles and/or general robust handling, may be performed. In such cases, an encapsulation system 32, such as a laminated pouch, may be optionally provided to enclose the heating system 10, and, in such cases, the encapsulation 32 may include connectivity and/or pass-throughs to allow for the provision of power 40 through the encapsulation system 32 to the heating system 10. Finally, the heating system 10, such as including the encapsulation 32, may be integrated into the wearable 50 via any known method, such as by sewing, lamination, or the like.

Thus, encapsulation 32 may provide waterproofing, airproofing, or the like in order to protect the heating system and associated systems from any adverse environmental factors 30. To provide the encapsulation 32, various known techniques may be employed. For example, acrylics may be laminated onto each side of the heater substrate 14, such as to create a sealed lamination lip around the substrate 14, with the only projections extending therefrom having the acrylic lamination seal therearound. Further, such a laminated pouch may be treated with, for example, ultra-violet radiation such that the lamination is sealed onto, and provides maximum protection of, the heating system 10. Of note however, the more layers that are added to the heating system, such as including encapsulation 32, the less conformable to the wearable the heating system will become, particularly in the case where added layers have significant thickness thereto.

In some embodiments, the encapsulation 32 that protects from environmental conditions 30 may not require any secondary effort beyond production of the heating system 10. For example, substrate and ink combinations may be selected that are submersible and conformable, or only that portion of the substrate having printed electronics thereon to provide the heating system may be sealed, such as with a single acrylic laminate, from environmental conditions.

As referenced above, heating systems 10 with or without encapsulation 32 connect to one or more driving circuits 52. In certain embodiments, interconnection 54 to, for example, driver circuit 52 and/or power 40, may include a high contact surface area, such as to enable the heating system 10 to draw significant current 16 from the power source 40. Also as referenced above, interconnection 54 may also include or comprise printed electronic surfaces. Such interconnections 54 may additionally include classical wiring, micro-connection, and/or electromechanical connection techniques, by way of non-limiting example.

The various interconnections 54, such including those from the driver circuit 52 to external control systems, if any, and/or to the power supply 56, may extend outwardly from the heating system 10. These interconnections 54, as well as data requirements and power requirements, may be dependent on the unique structure of a given heating system 10. For example, different carbon inks applied in the formulation of the heating system 10 may have different power requirements, such as 5-15 volts, or more particularly 5, 9, or 12 volts, by way of non-limiting example.

Similarly, interconnects 54 may also be or include one or more universal connectors known in the art for connectivity to, for example, the aforementioned voltages. Further, such a universal connector may be or include other known connector types, such as USB, micro-USB, mini-USB, lightning connector, and other known interconnects. Additionally and alternatively, proprietary interconnects 54 may be provided in conjunction with the embodiments.

The aforementioned driving circuit 52 may or may not be in direct physical association with the heating system 10 and the interconnects 54. By way of example, the driver circuit 52 may be included as a self-contained system in the electrical pathway between the power source 40 and the heating system 10. The driver circuit 52 may include control systems 52*a* or connectivity to control systems 52*b*, such as to allow for remote and/or wireless control of the heating system 10, and/or to provide limitations on the heating system, such as amount of heat delivered, amount of current delivered or power drawn, variation between different heat delivery levels, and the like. Such remote connectivity may include wireless connectivity, such as using NFC, blue tooth, WiFi, or cellular connectivity, such as to link to an app 60 on a user's mobile device 62, by way of non-limiting example.

Of note, the control system(s) 52*a, b*, such as a Bluetooth-based control system, may allow for a change in temperature automatically or manually, as referenced herein. Accordingly, the control system(s) 52*a, b* may communicate, such as via Bluetooth, radio-frequency (RF), near-field communications (NFC), or the like, with a secondary controlling device, such as an app on a mobile device. The aforementioned change may occur only for a certain period of time, which may be brief, such as particularly if the control system indicates that significant power will be consumed on a desired setting. For example, it may be manually or automatically selected that a user has pre-set a heater to heat to 85 degrees for 90 seconds, such as only while the user briefly walks a dog outside in 10 degree weather, because it is understood that the user can recharge the system completely immediately after the short-term use. However, if a user is going on a one hour jog, and that jog is in the same 10 degree weather, the user may prefer that the heater operate at 45 degrees for 50 minutes of the hour before the charge is fully consumed.

The power source 40 that delivers power to the heating system 10, such as through the driver circuit 52, may preferably provide a battery life of, for example, 2-10 hours, or, more specifically, 4-8 hours. This power may be provided, for example, from a permanent power delivery system embedded in the garment, such as may use a rechargeable, removable, replaceable, or permanent battery, by way of non-limiting example, or by a secondary power source suitable to be plugged into the driver circuit system, such as may be embedded in or associated with a mobile device or other mobile power source, via a proprietary or non-proprietary connector, such as via a micro USB, lightning connector, or the like. As referenced, typical power provision elements may include batteries, such as rechargeable batteries, such as lithium ion batteries. Such batteries may typically provide high levels of heating very quickly, and then allow for a quick ramp-down in heat delivery to avoid unnecessary power use during the ramp-up or ramp-down phases of power provision.

Atypical power sources may additionally be used to provide the power source 40 for heating system 10. For example, kinetic power sources, such as those that store power based on movement, and/or other similar magnetic and/or piezo-electric power systems, may be embedded in or connectable to the wearable in order to provide primary, secondary, permanent, or temporary power to the heating system 10 via the driver circuit 52. Likewise, primary, secondary, and/or atypical power source(s) 40 may work together and in conjunction with the aforementioned system control, such as may be embedded in or communicatively associated with the driver circuit 52, to deliver power only upon particular triggers. For example, a wearable equipped with heaters at multiple locations, such as in the elbow of a sweatshirt and in the upper back region, may allow individual ones of those locations to be activated only upon certain events indicated by on-board, such as printed electronic, sensors 70, which may additionally be associated with the substrate 12. For example, a kinetic sensor may sense movement, and during the movement phase may activate a heater in a given location, such as in the upper back region in the prior example. However, upon sensing by the kinetic sensor of the stoppage of movement, the heating element in the elbow of the sweatshirt may be activated. This may be done for any of a variety of reasons understood to the skilled artisan, such as for a pitcher who stops pitching between innings, but wishes to keep his or her elbow "warm" so as to avoid injury.

Such variations in heating elements may not only occur for wearables having multiple heaters, but may similarly include variable heater designs for different purposes. For example, smaller heaters consume appreciably less power than larger heaters, and thus necessitate a lower level power supply. Consequently, in the prior example of a sweatshirt for a pitcher, a small heater located only proximate to the pitcher's "Tommy John" ligament in his or her elbow may require little power for activation, but may nevertheless be enabled to deliver significant health impact to the wearer, such as to keep this oft-injured ligament warm after inactivity of more than 10 minutes has occurred.

Moreover, variability in heat levels, such as may be indicated by the driver circuit system, may be made manually by the user or automatically based on system characteristics. For example, lower levels of heat in a hand warmer heating system, such as may be embedded in the pockets of a sweatshirt or in a user's gloves, may be needed if the temperature is colder, i.e., only a particular temperature differential from environmental conditions may be necessary in order to make a user feel "warm". That is, a user in an environment where the temperature is 10 degrees Fahrenheit may feel much warmer if the user's gloves are warmed to 40 degrees Fahrenheit, rather than warming the gloves all the way to a maximum heating level of 65 degrees. However, in the event the ambient temperature is 35 degrees, the user may need the heating element to go to 65 degrees in order for the user to feel the same level of "warmth".

Additional considerations in power delivered to the heater and/or in the heat delivered may occur based on the use case of the wearable and of the heater. For example, in instances in which the heater might be in substantially direct contact with or very close to the user's skin, the control system associated with the driver circuit 52 discussed herein must limit the power such that the heating is not sufficient to burn, cause discomfort to, or otherwise harm the user. Such concerns may be addressed, in part, through the use of self-regulating inks to provide the heating elements in certain exemplary embodiments.

For example, a positive temperature coefficient (PTC) heater may provide a self-regulating heater. A self-regulating heater stabilizes at a specific temperature as current runs through the heater. That is, as temperature is increased the resistance of the self-regulating heater also increases, which causes reduced current flow and, accordingly, an inability of the heater to continue increasing in temperature. On the contrary, if the temperature is reduced, the resistance decreases, thereby allowing more current to pass through the device. In a typical embodiment, a self-regulating/PTC heater thus provides a stabilized temperature that is independent of the voltage applied to the heater.

Figure 2:
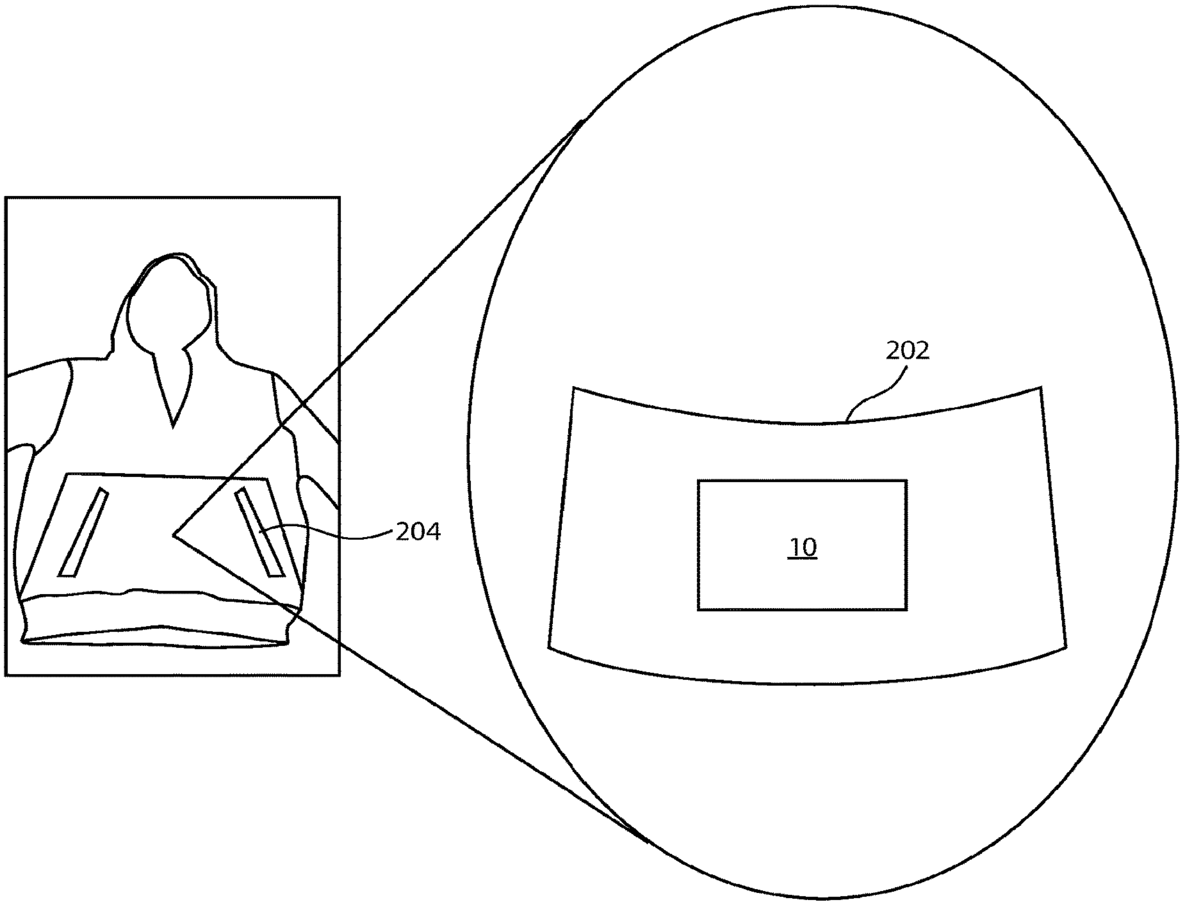
FIG. 2 is a schematic and block diagram illustrating a heater according to the embodiments.

Secondary systems 202 may be provided in conjunction with heating system 10, such as to hold in warmth, as illustrated in FIG. 2. For example, in an embodiment having a laterally crossing pocket 204 in a sweatshirt, the single pocket across the sweatshirt may be lined 202 on the interior portion thereof, and may have the heating element provided interior to the lining of the pocket thereof, in order that the heat generated from the heating system 10 is held within the pocket 204 of the sweatshirt to the maximum extent possible.

As discussed throughout, it may be advantageous, particularly for certain types of wearables, that the heating system and/or the other systems associated therewith be conformable. This conformability may apply to the application of forces by the user or based on the activity, conformance to the physical profile of the wearable itself, or the like. Additional considerations may arise due to the conformability of the heating system and/or its associated systems. For example, delivered heat levels may vary based on the physical configuration of the heating elements, i.e., when the heating system is bent or partially folded, it may deliver greater or lesser heat in certain spots than is anticipated. Needless to say, some of this variability may be accounted for using a protective dielectric layer 22, such as is referenced above.

As discussed throughout, additional sensors, integrated circuits, memory, and the like may also be associated with the discussed heating system 10, may be printed on the substrate 14 thereof, and/or may be formed on or in systems associated therewith, and/or on the substrates thereof. It goes without saying that, in such embodiments, the associated electronics may be discrete from the heating system and those systems associated with the heating system, but may nevertheless be similarly conformable to the wearable, the substrate of the heating system, and so on. Further, those skilled in the art will appreciate that such other electronic circuits may or may not be formed by printing processes on the same substrate, or on a physically adjacent substrate, of the heating system.

Moreover, the embodiments may include additional layers (not shown) to those discussed above. For example, a heater substrate may be provided in the form of a highly adhesive sticker, wherein the sticker may or may not provide a substrate suitable for receiving printed electronics on one side of the "sticker." In such an instance, the compatibly adhesive surface may be applied to the opposing face of the sticker, such as via additive process printing, lamination, deposition, or the like.

Figure 3:
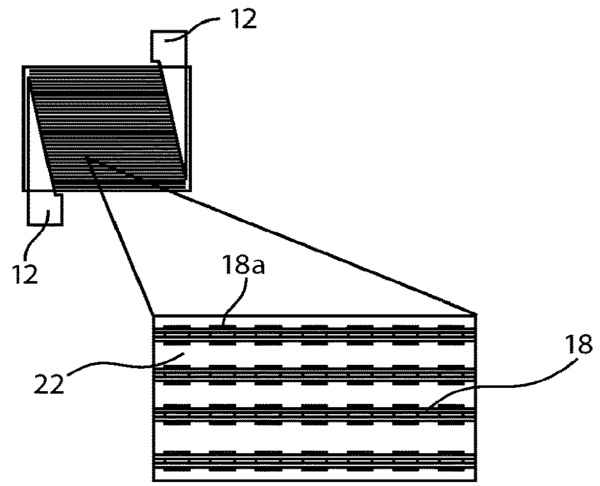
FIG. 3 is an exemplary implementation of the embodiments having a conductor layer with contact points at the top right and bottom left of the heating system.
Figure 4:
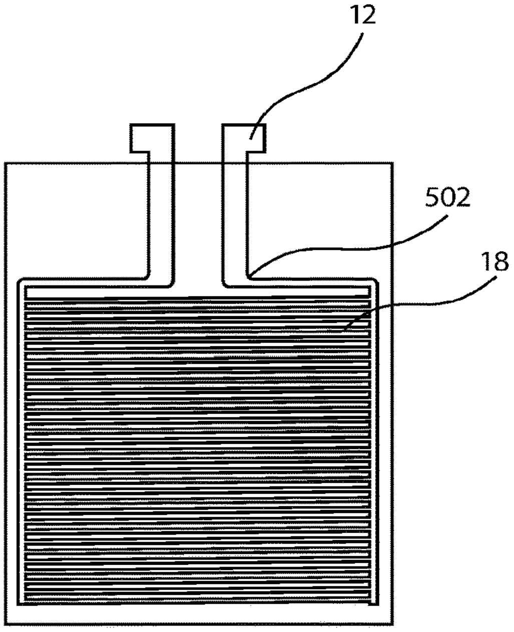
FIG. 4 is an exemplary implementation of a conductive and resistive layer heating system.
Figure 5:
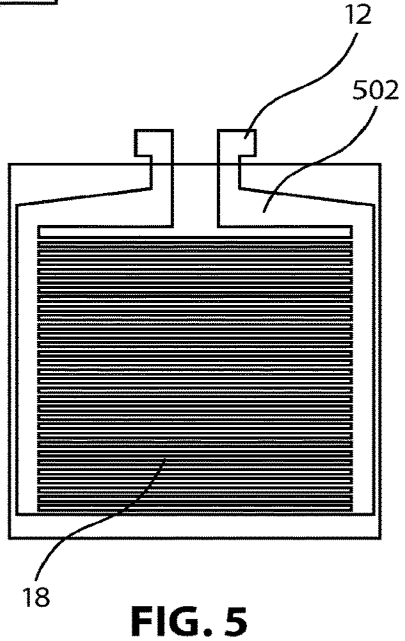
FIG. 5 is an exemplary implementation of an embodiment having an enhanced size of the conductive layer associated with the contact pads at the top of the device.

FIGS. 3, 4, and 5 illustrate exemplary implementations of the disclosed embodiments. More particularly, FIG. 3 illustrates a conductor layer 12 having contact points at the top right and bottom left of the heating system. Further illustrated are discreet heater elements 18*a* of the resistive layer 18, shown in the blow up of FIG. 3.

FIG. 4 illustrates an additional exemplary implementation of a conductive 12 and resistive layer 18 heating system. FIG. 5 illustrates an additional embodiment, in which the current choke point 502 of FIG. 4 is remedied by enhancements in the size of the conductive layer 12 associated with the contact pads at the top of the device. Of note, each of the embodiments of FIGS. 3, 4, and 5 illustrate a dielectric layer 22 printed over the conductive 12 and resistive layers 18, with the contact points extending beyond the dielectric layer 22 to allow for the interconnections 54 discussed herein.

Figure 6:
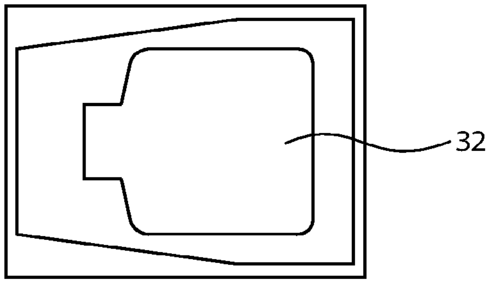
FIG. 6 illustrates an exemplary implementation of a heating system enclosed in an encapsulation layer.

FIG. 6 illustrates an exemplary implementation of the heating system 10 of FIG. 5 enclosed in an encapsulation layer 32. As noted throughout, the encapsulation layer 32 may protect the heating system 10 from environmental conditions.

Figure 7:
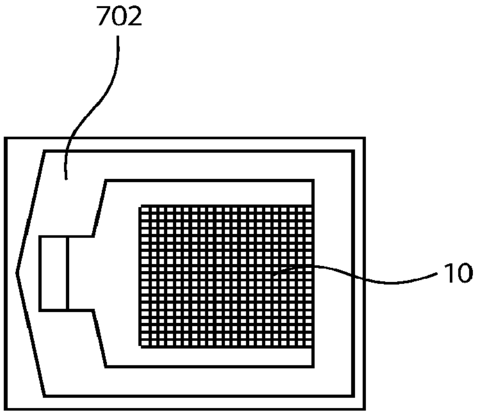
FIG. 7 illustrates an exemplary implementation in which the heating system is laminated to a textile.

FIG. 7 illustrates an exemplary implementation in which the heating system 10 has been laminated to a textile 702. Available textiles may include, by way of non-limiting example, nylons, cottons, or the like.

Figure 8:
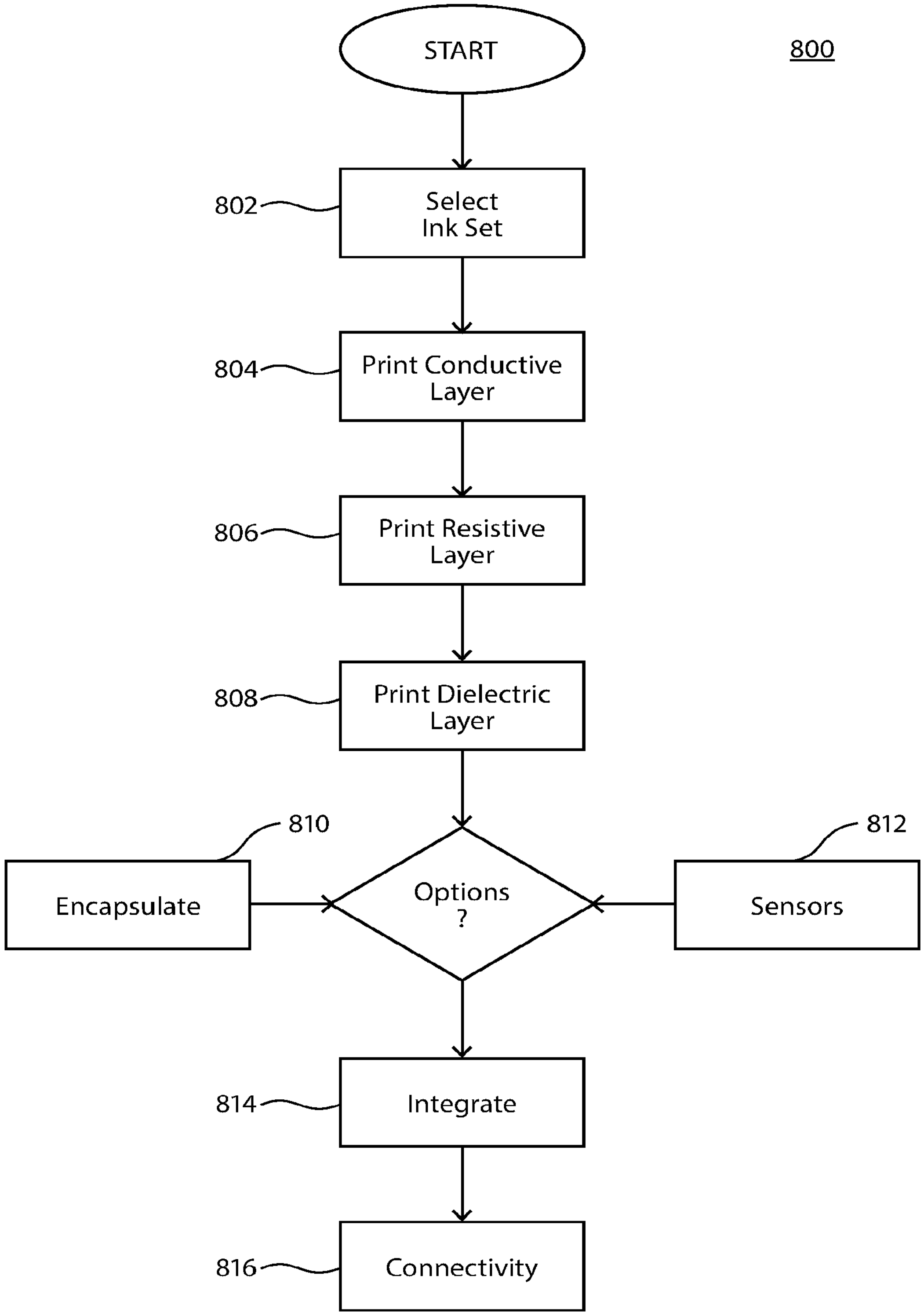
FIG. 8 is a flow diagram illustrating an exemplary method of providing a conformable heater, such as for use in a wearable.

FIG. 8 is a flow diagram illustrating an exemplary method 800 of providing a conformable heater, such as for use in a wearable. At step 802, an ink set is inter-matched for use to print compatible ink layers within the ink set, and is matched to a receiving organic or inorganic conformable substrate. At step 804, a conductive layer formed of at least one ink from the ink set is printed on the substrate.

At step 806, a resistive layer is printed from the ink set, wherein the resistive layer provides at least a plurality of heating elements in electrical communication with the conductive layer. At step 808, a dielectric layer is printed from the ink set in order to insulate the conductive and resistive layers.

At optional step 810, the substrate having at least the conductive layer and the resistive layer printed thereon is at least partially encapsulated. At optional step 812, one or more sensors associated with the operation of the heater may be integrated with and/or printed on the substrate.

At step 814, the heater is integrated with a wearable. Integrating may be by sewing, lamination, adhesion, or any like methodology. Moreover, at step 816, the heater may be connectively associated with one or more driver circuits having control systems communicative therewith, and with one or more power source connections to allow for power to be supplied to the heating elements via the conductive layer. By way of example, step 816 may include the printing or other manner of interconnecting of one or more electrical interconnections to the heater.

Figure 9:
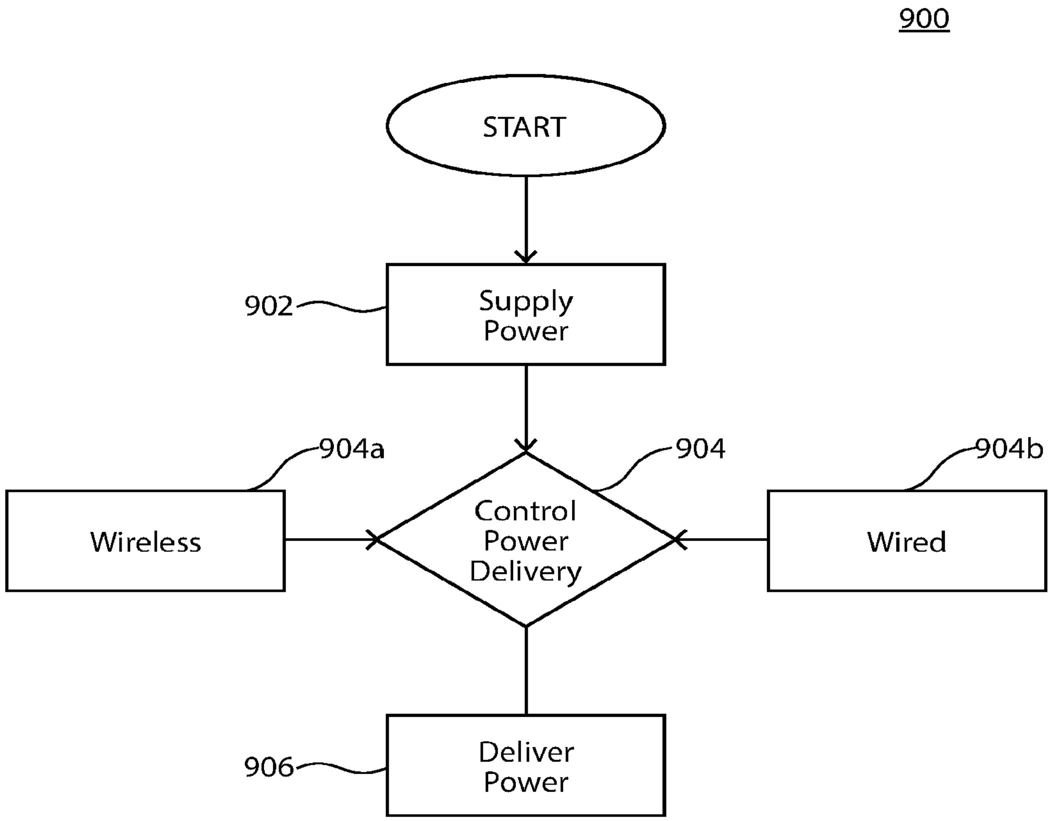
FIG. 9 is a flow diagram illustrating a method of using a conformable heater system within a wearable.

FIG. 9 is a flow diagram illustrating a method 900 of using a conformable heater system within a wearable. In the illustration, the conformable heater may be associated with a power source at step 902. This association may include a permanent association, such as via recharging of a permanently embedded battery, or a removable association, such as wherein an external power source, such as a battery, a mobile device, or the like, may be removably associated with the heater.

At step 904, the driver circuit that delivers power from the power source to the heater may be variably controlled. Optionally, at step 904*a*, wireless control may be via a wireless connection, such as from a mobile device to the driver circuit. This wireless, or a wired, connection may be controllable using a user interface provided by an "app" on the mobile device, by way of non-limiting example. The control provided thereby may be automated based on predetermined triggers or operational limitations, manual, or a combination thereof. Wireless control may be provided over any known type of wireless interface.

Optionally, at step 904*b*, wired control may be via a wired connection from a mobile device to the driver circuit, such as via a micro-USB connection to the heater. As will be understood by the skilled artisan, power may also be supplied via this connection in alternative embodiments.

Further, the descriptions of the disclosure are provided to enable any person skilled in the art to make or use the disclosed embodiments. Various modifications to the disclosure will be readily apparent to those skilled in the art, and the generic principles defined herein may be applied to other variations without departing from the spirit or scope of the disclosure. Thus, the disclosure is not intended to be limited to the examples and designs described herein, but rather is to be accorded the widest scope consistent with the principles and novel features disclosed herein.

What is claimed is:

1. A flexible heater suitable for embedding in a wearable, comprising:
- a substrate;
- a set of additively deposited inks selected, in combination, to achieve a particular fineness, pitch, density and consistency, the selection being by a matching of each additively deposited ink in the set to at least:
  - a receptivity of the substrate to each of the additively deposited inks;
  - a conductivity between the substrate to each of the additively deposited inks;
  - a chemical reactivity as between the substrate and each of the additively deposited inks; and
  - differing printing and curing methodologies as between each of the additively deposited inks;
- each of the additively deposited inks being printed in successive additively printed layers onto at least one substantially planar face of the substrate to form at least:
  - at least one conductive layer capable of receiving current flow from at least one power source;
  - at least one resistive layer electrically associated with the at least one conductive layer and comprising a plurality of heating elements capable of generating heat upon receipt of the current flow; and
  - at least one dielectric layer capable of at least partially insulating the at least one resistive layer;
- the particular fineness, pitch, density and consistency being an approximation of subtractive processes when the substrate is unreceptive to the subtractive properties.

2. The flexible heater of claim 1, wherein the substrate comprises an inorganic substrate.

3. The flexible heater of claim 1, wherein the substrate comprises one selected from the group consisting of PET, PC, TPU, nylon, glass, fabric, PEN, and ceramic.

4. The flexible heater of claim 1, wherein each of the additively deposited inks includes ones selected from the group consisting of silver, carbon, PEDOT:PSS, and CNT inks.

5. The flexible heater of claim 1, wherein at least one of the additively deposited inks withstands environmental factors including at least moisture.

6. The flexible heater of claim 1, further comprising an encapsulation that at least partially seals at least the substrate having the each of the additively deposited inks thereon from environmental factors.

7. The flexible heater of claim 6, wherein the encapsulation comprises a laminated pouch.

8. The flexible heater of claim 1, further comprising an integration into the wearable of the substrate.

9. The flexible heater of claim 8, wherein the integration comprises one selected from the group consisting of a sewing, a lamination, and an adhesion.

10. The flexible heater of claim 1, further comprising a driver circuit connectively associated with the at least one conductive layer.

11. The flexible heater of claim 10, wherein the driver circuit comprises a control system, and wherein an amount of heat delivered by the heating elements is controlled by the control system.

12. The flexible heater of claim 11, wherein the control system comprises a wireless receiver.

13. The flexible heater of claim 12, wherein the wireless receiver comprises at least one of a Bluetooth, WiFi, NFC, cellular and RF receiver.

14. The flexible heater of claim 12, wherein a remote portion of the control system comprises a mobile device app.

15. The flexible heater of claim 12, further comprising at least one power source connectively associated with the driver circuit.

16. The flexible heater of claim 15, wherein the power source comprises a rechargeable battery.

17. The flexible heater of claim 1, wherein the dielectric layer insulates ones of the plurality of heating elements from shorting onto one another due to a conformability of the substrate.

18. The flexible heater of claim 1, wherein the dielectric layer insulates heat produced by the heating elements to avoid localized overheating.

* * * * *